(12) United States Patent
Siebeneick

(10) Patent No.: US 9,067,472 B2
(45) Date of Patent: Jun. 30, 2015

(54) ARRANGEMENT FOR THE REAR END OF A MOTOR VEHICLE WITH A FUEL FILLER LINE AND A COMPOUND CRANK

(75) Inventor: Jürgen Siebeneick, Oberwesel (DE)

(73) Assignee: GM Global Technology Operations LLC, Detroit, MI (US)

( * ) Notice: Subject to any disclaimer, the term of this patent is extended or adjusted under 35 U.S.C. 154(b) by 384 days.

(21) Appl. No.: 13/528,380

(22) Filed: Jun. 20, 2012

(65) Prior Publication Data
US 2012/0326411 A1    Dec. 27, 2012

(30) Foreign Application Priority Data

Jun. 22, 2011    (DE) .......................... 10 2011 104 865

(51) Int. Cl.
*B60G 3/18* (2006.01)
*B60G 21/05* (2006.01)
*B60K 15/04* (2006.01)
*B60K 15/063* (2006.01)

(52) U.S. Cl.
CPC .............. *B60G 21/051* (2013.01); *B60K 15/04* (2013.01); *B60G 2204/201* (2013.01); *B60K 2015/0638* (2013.01); *B60K 2015/0474* (2013.01)

(58) Field of Classification Search
CPC .......... B62D 21/00; B62D 21/11; B62D 7/22; B62D 25/2027; B60G 3/18; B60G 3/20; B60G 3/02; B60G 3/00; B60K 15/01; B60K 15/04; B60K 15/063
USPC ............................. 280/788, 124.143; 180/312
See application file for complete search history.

(56) References Cited

U.S. PATENT DOCUMENTS

| | | | | |
|---|---|---|---|---|
| 4,969,661 | A * | 11/1990 | Omura et al. ........... | 280/124.143 |
| 5,560,651 | A * | 10/1996 | Kami et al. .................... | 280/788 |
| 5,702,125 | A | 12/1997 | Nakajima | |
| 6,179,328 | B1 * | 1/2001 | Kawagoe et al. ............. | 280/788 |
| 7,360,621 | B2 * | 4/2008 | Komiya ........................ | 180/312 |

(Continued)

FOREIGN PATENT DOCUMENTS

| | | |
|---|---|---|
| EP | 1 674 307 A1 | 6/2006 |
| EP | 1 806 272 A1 | 7/2007 |

(Continued)

OTHER PUBLICATIONS

Fiat Automotive Australia "Fiat Scudo" published 2008, accessed via www.wattstvc.co.uk/brochures/fiat/fiat%20Scudo%20brochure.pdf.

*Primary Examiner* — Joseph Rocca
*Assistant Examiner* — Daniel Yeagley
(74) *Attorney, Agent, or Firm* — John A. Miller; Miller IP Group, PLC

(57) ABSTRACT

The invention relates to an arrangement for the rear end of a motor vehicle with a fuel filler line and a compound crank which exhibits two trailing arms and a cross member connecting the trailing arms with each other, with the trailing arms being pivotably supportable in the direction of their longitudinal axis on their one end area including a connection element on the body shell of the vehicle, and having on their other end area a holder for a wheel bearing unit. Provision is made that the filler line crosses at least one of the trailing arms in the area between a connection site for the cross member and the connection element. The invention further relates to a compound crank for the rear end of a motor vehicle, and a rear end of a vehicle.

15 Claims, 3 Drawing Sheets

(56) References Cited

U.S. PATENT DOCUMENTS

| | | |
|---|---|---|
| 7,422,242 B2 | 9/2008 | Matsumoto |
| 7,478,820 B2 | 1/2009 | Murata |
| 7,654,351 B2 * | 2/2010 | Koike et al. ................ 180/68.5 |

FOREIGN PATENT DOCUMENTS

| | | | | |
|---|---|---|---|---|
| JP | 56135307 A | * | 10/1981 | |
| JP | S 59-180959 A | | 10/1984 | |
| JP | 01052515 A | * | 2/1989 | |
| JP | 11-099837 A | | 4/1994 | |
| JP | 2001105900 A | * | 4/2001 | |
| JP | 2002067713 A | * | 3/2002 | |
| JP | 2003-19910 A | | 1/2003 | |
| JP | 2003019910 A | * | 1/2003 | |
| JP | 2011-13925 A | | 1/2011 | |

* cited by examiner

ARRANGEMENT FOR THE REAR END OF A MOTOR VEHICLE WITH A FUEL FILLER LINE AND A COMPOUND CRANK

The invention relates to an arrangement for the rear end of a motor vehicle with a fuel filler line and a compound crank, which exhibits two trailing arms and a cross member connecting the trailing arms with each other, with the trailing arms in the direction of their longitudinal axis on their one end area being pivotably supported on the body of the vehicle by means of a connecting element and on their other end having a holder for a wheel or the brake of a wheel. The invention further relates to a compound crank, a filler line, and a rear end of a motor vehicle.

BACKGROUND OF THE INVENTION

In the compact class, modern motor vehicles increasingly have compound cranks. Customarily a compound crank consists of two trailing arms which are connected with each other by means of a cross member.

Usually trailing arms in the direction of their longitudinal axis have a holder on an end area, on which a wheel or the brake for the wheel is attached. Additionally, on their other end area trailing arms have a bushing by means of which the trailing arms are pivotably supported on the vehicle body by about at least a horizontal turning axis.

Often the bushings for the trailing arms are placed in the area of the motor vehicle middle on the body shell, so that for reasons of space the fuel tank of the vehicle comes to be between the longitudinal members and in the intermediate space between the longitudinal members is pushed in the axial direction of the longitudinal members far enough so that the cross member can freely vibrate without contact with the fuel tank.

Customarily the fuel tank has its inlet on the side that is transverse to the travel direction of the vehicle and points rearwards. The fuel line attached thereon extends essentially horizontally in a first section until the fuel line has passed the compound crank and ends in a section that runs upward at an angle to it, which ends in a filler neck. Usually the filler neck is located on a lateral outer wall of the vehicle, so that filling is possible in simple fashion via the filler neck.

Due to the essentially horizontal extension of the fuel line in the area of the compound crank, free swinging of the compound crank in an upward direction is limited since the cross member of the compound crank would butt against the fuel line. Since the available vibrational path of the compound crank is a measure of attainable riding comfort, in earlier vehicles with a compound crank, the potential for improving riding comfort has still not been fully exploited.

Therefore the task of the invention is to propose an arrangement for the rear end of a motor vehicle with a fuel filler line and a compound crank, through which greater riding comfort is attained. Additionally, a rear end of a motor vehicle is proposed that is suited for the installation of such an arrangement of a fuel filler line and a compound crank.

SUMMARY OF THE INVENTION

Advantageous embodiments of the invention are gleaned from the subordinate claims, the following specification and the figures.

An invention-specific arrangement for the rear end of a motor vehicle has a fuel filler line, especially a filling tube, and a compound crank, especially a semi-independent rear suspension, which exhibits two trailing arms and a cross member connecting the trailing arms with each other. In the direction of their longitudinal axis, at their one end area the trailing arms are pivotably supportable or pivotably supported by means of a connecting element on the body shell of the motor vehicle. On their other end area, the trailing arms have a holder for a wheel bearing unit or a wheel connection unit. Preferably the wheel bearing unit exhibits at least a part of the brake for the one wheel, as for example the brake disk among other things, as well as the wheel itself.

According to the invention, provision is made that the filler line crosses at least one of the trailing arms in the area between an attachment site for the cross member and the connection element.

Through this measure, an especially large vertical vibration path of the compound crank in the installed state of the compound crank is attained, since the fuel line or filler line no longer stands in the way of the cross member of the compound crank. According to the invention, namely the filler line is guided in such a way that the filler line crosses the trailing arm and no longer—as previously—does the filler line cross the cross member. In that the crossing area of filler line and compound crank is provided on the trailing arm in the area between the attachment point for the cross member and the connection element, the filler line is brought into such a position that even with the maximum possible vibration path of the compound crank relative vis-à-vis the vehicle body, limitation by the filler line is avoided. Due to the large vibration path attained, the result is greater riding comfort during motion of the vehicle.

According to one embodiment of the invention, provision can be made that the filler line crosses at least one of the trailing arms in the area of its connecting element. By this means, a limitation of the vibration path of the compound crank by the filler line can be avoided in an especially simple way.

It is suggested that the filler line, proceeding from its filler neck, crosses the trailing arm in a section that runs from outside toward the inside. By this means in a technically simple way, a fuel tank placed between the trailing arms is attainable by means of the filler line and at the same time the filler neck is attachable on the lateral outer wall of the vehicle, accessible from outside. Through this measure, the structure in the underbody area of the vehicle is ensured to have a particularly compact configuration.

According to one embodiment of the invention, provision is made that the filler line is positioned in the crossing area with the at least one trailing arm above the trailing arm. By this means, the filler line can be guided from the filler neck on the outside of the vehicle to the inlet into the vehicle's fuel tank, implementable with a short length of line. Horizontally placed sections can largely be avoided, so that optimal filling of the tank with fuel is ensured. Also, in this way the filler line is implemented in an especially simple course.

Additionally, the invention comprises a compound crank for the rear end of a vehicle, which especially serves for use in an arrangement of the type described above.

The compound crank or semi-independent rear suspension preferably has two trailing arms and a cross member connecting the trailing arms with each other. Preferably the trailing arms in the direction of their longitudinal axis on their one end area are pivotably supportable on the body of the vehicle by means of a connecting element with the trailing arms on their other end area having a holder for a wheel bearing unit or wheel attachment unit. Preferably the wheel bearing unit exhibits at least a part of the brake for the one wheel, as for example the brake disk among other things, as well as the wheel itself, preferably.

According to the invention, the connecting elements and holders of each trailing arm are so configured on the compound crank that in an installed state of the compound crank, with the vehicle partially loaded, the connecting element in essence is positioned at the height of the holder or above the holder.

Due to such a configuration of the compound crank, the rear wheels of the vehicle will be guaranteed to deflect rearwards, if while the vehicle suffers impacts while traveling on a rough road. In other words, due to the configuration of the invention-specific compound crank, the slanted suspension angle is advantageously influenced so as to attain great riding comfort, especially if the vehicle is traveling on an uneven road surface.

To be understood as partial loading according to the invention is a reference loading as represents customary practice. Such partial loading is preferably seen as a loading with two passengers, especially with the usual luggage.

Use of such a compound crank presents itself in particular with an arrangement of compound crank and fuel filler line of the type previously described.

In that the filler line crosses the at least one trailing arm of the compound crank in the area between the attachment point for the cross member and the connection element for attachment to the vehicle body shell, in the area of the compound crank below the frame of the body shell, sufficient structural space is achieved to configure the compound crank in such a way that the connection element is essentially at the height of the holder or above the holder, to ensure in this manner that the rear wheels will deflect backwards when the compound crank oscillates. The improved slanted suspension angle of the wheels thereby attained and the enlarged vibrational path of the compound crank result in especially great riding comfort.

Preferably the connection element and holder of each trailing arm are configured so that in the installed condition of the compound crank, with the vehicle partially loaded, the horizontal pivoting axis of the semi-independent axis essentially is at the height of the vertical center of the holder or above the vertical center of the holder.

In the context of the present invention, the horizontal pivoting axis relates to the horizontal pivoting axis in the installed state of the compound crank, about which the semi-independent axis is allowed to pivot relative vis-à-vis the vehicle body shell. In the context of the invention, by the vertical center of the holder, viewed vertically, the middle area or center point of the holder is to be understood. Preferably the vertical center corresponds to the middle of the wheel, especially in a vertical direction.

According to one embodiment of the invention, provision is made that on its end the trailing arm is configured with double shear, for example in the manner of a fork, especially U-shaped. By this means the compound crank with its trailing arms can in a simple fashion be attached on an accompanying connection element for attachment with the vehicle's body shell, which is configured as a bushing, and which is horizontal in its installed state and relative to its central axis. The double-sheared configuration of the trailing arm on its end or end area makes possible a connection on the inner sleeve of the bushing from left to right that is positioned horizontally with its central axis. By this means a good load distribution is achieved in the connection area, so that component loading is reduced.

Also the double-sheared configuration of each trailing arm on its end or end area makes it possible to make a connection to the outer sleeve of the bushing from above and below that is positioned horizontally with its central axis.

Alternatively, provision can also be made that the trailing arm is configured to be single-sheared on its end. By this means the compound crank with its trailing arms can be attached in a simple fashion to an accompanying connection element for attachment to the vehicle's body shell, which is configured as a bushing and is positioned vertically in an installed state relative to its central axis. By this means, in an installed state, the connection element is positioned with a relatively greater installed height in the vertical direction of the vehicle, so that between the underbody or longitudinal member of the vehicle's body shell, on which the connection element is mounted in the installed state of the compound crank, and the particular trailing arm of the axis of the compound crank, a relatively large free space is available, which can be used for placement of the filler line, without the placed filler line then limiting the vibrational path of the compound crank.

Additionally the invention comprises a fuel filler line which serves for an arrangement of the type described above with a fuel filler line and a compound crank.

The invention additionally comprises a rear end for a vehicle with an arrangement of the type named previously, which especially exhibits a fuel filler line of the type described above and a compound crank of the type described above.

Also the invention comprises a motor vehicle with such a rear end.

Additional goals, advantages, features and application options of the present invention are gleaned from the following description of an embodiment example aided by the drawings.

BRIEF DESCRIPTION OF THE DRAWINGS

Shown schematically are.

DETAILED DESCRIPTION

Figure 1:
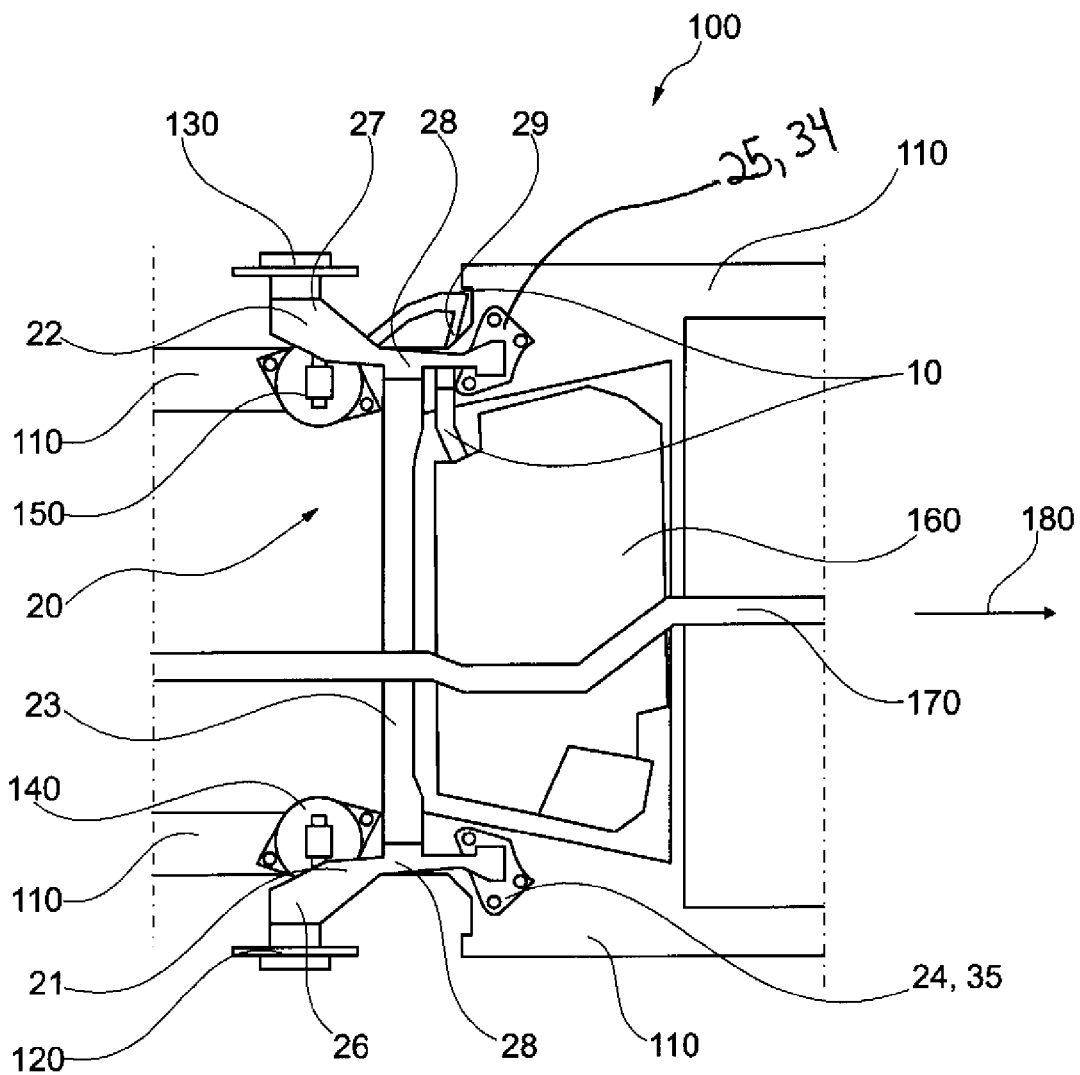
FIG. 1 a possible embodiment form of a rear end of a vehicle as seen from below.

FIG. 1 shows a possible embodiment form of a rear end 100 of a motor vehicle as a cross section in the area of a compound crank 20 of the rear end, 100 in a view from below.

The rear end 100 has a body-shell structure 110 on which the compound crank 20 is pivotable, and especially in the vertical direction of the rear end 100 pivotably supported. For this, the compound crank 20 has connection elements 24, 25, by means of which the compound crank 20 is attached to the body shell 110. The connection elements 24, 25 are for example so-called bushings, especially A-bushings.

The connection elements 24, 25 are placed on two trailing arms 21, 22 of the compound crank 20, with the connection element 24 assigned to the trailing arm 21 and the connection element 25 assigned to the trailing arm 22. Preferably connection elements 24 and 25 are on an end situated in the direction of longitudinal axes of the trailing arms 21, 22, which is positioned in the direction of travel according to arrow 180. On the other ends of the trailing arms 21, 22 the trailing arms 21, 22 preferably have holders 26 and 27, on which wheel bearing units 120 and 130 is mounted. The wheel bearing units 120 and 130 preferably exhibits parts of the brake, such as a brake disk for example, and the wheel itself.

The trailing arms 21, 22 are connected to each other by a cross member 23. In the area between the cross member 23 and the particular holders 26 or 27 of the particular trailing arm 21 or 22 a suspension or damper unit 140. and 150 is placed, which is braced with its one end against the particular trailing arm 21 or 22 and with its other end against the body shell 110 of the rear end 100.

The rear end 100 further has a fuel tank 160, which preferably extends to close to the cross member 23 of compound crank 20 and is positioned with its end area between the trailing arms 21 and 22 of the compound crank 20.

Additionally, the rear end 100 is transected by an exhaust line 170, which is a component part of the exhaust system of the vehicle, not shown.

The fuel tank 160 is connected with a filler line 10 which ends in a filler neck, not visible in FIG. 1, which preferably is placed on the lateral outer wall of vehicle body shell 110 and is accessible from outside, to be able to fill the fuel tank 160 with fuel via the filler line 10.

Provision is made that the filler line 10 crosses one of the trailing arms 21, 22 in the area between the attachment site 28 for cross member 23 and the connection element 25, and especially the filler line 10 is positioned above the one trailing arm 22. By this means, the compound crank 20 is pivotable vertically over a large pivoting path, without the compound crank colliding with the filler line 10.

Preferably the filler line 10 runs essentially horizontally with one section 29 in the crossing area with the trailing arm 22. Preferably the filler line 10 to the fuel tank 160 is a descending one, especially descending throughout.

Figure 2:
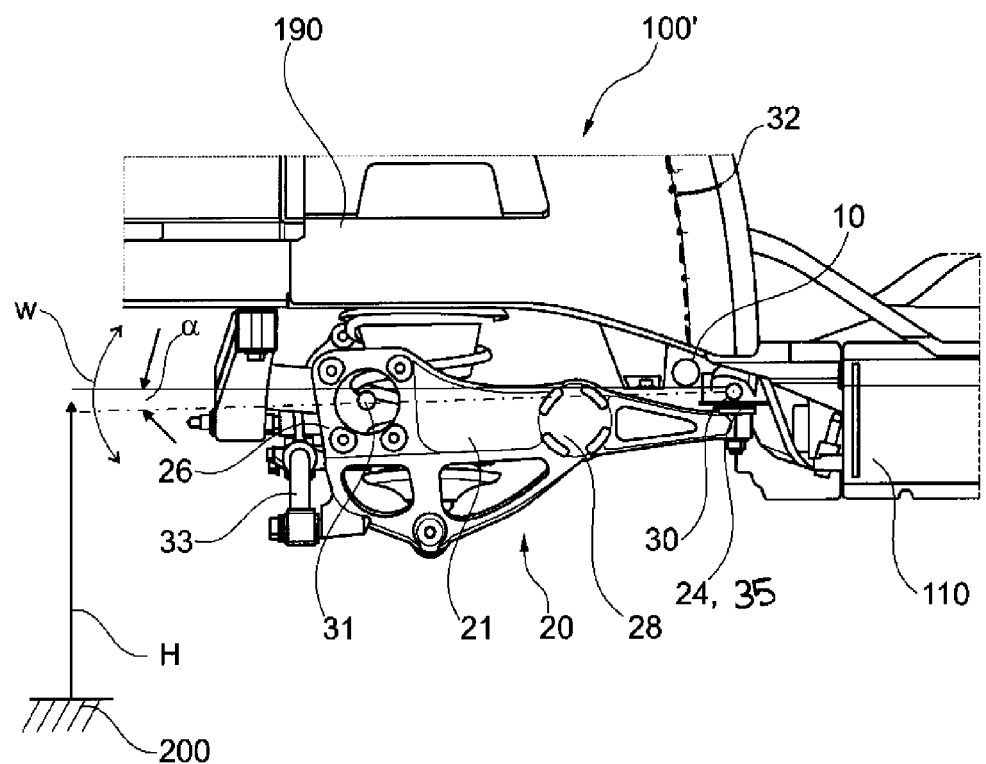
FIG. 2 another rear end of a vehicle in a side view as a cross section.

FIG. 2 shows a cross section of a rear end 100' in a side view. By this means, only the trailing arm 21 of the compound crank 20 is visible. Essentially in alignment with the trailing arm 21, the trailing arm 22 is found as seen in the direction of the side view according to FIG. 2, placed behind the trailing arm 21.

Components of rear end 100' of FIG. 2 that are identical or functionally equivalent to components of the rear end 100 of FIG. 1, are provided with the same reference symbols; in this regard reference is made to the specification of the rear end 100 of FIG. 1.

As is evident from FIG. 2, the filler line 10 is above the two trailing arms 21, 22 in the area between attachment site 28 for the cross member 23 and the particular attachment element 24 or 25. In FIG. 2, the essentially round cross section of the essentially horizontally-running section 29 of the filler line 10 is visible, which is placed below the lower end of wheel housing 190 and thus also below the wheel housing placed on the opposite side and not visible from FIG. 2. With the aid of the schematic dots-and-dashes line 32, the course of the filler line 10 upward in a vertical direction is shown.

FIG. 2 further shows that each trailing arm 21 or 22 is configured regarding the particular connection element 24 or 25 and holder 26 or 27 on compound crank 20 so that the horizontal pivoting axis 30 of compound crank 20 is positioned above the vertical center 31 of holder 26 or 27, and thus pivoting axis 30 is higher than the vertical center 31 of the holder 26 or 27. From this there arises a slant suspension angle a through which, when the vehicle is traveling on uneven surfaces, the compound crank 20 moves with a pivot path W about pivoting axis 30, so that the rear wheels are deflected rearwards in an arc in addition to moving up and down.

The height of pivoting axis 30 is designated in FIG. 2 by the reference symbol H. In the context of the invention, by height H, the distance of the pivoting axis 30 to traveling path 200 is understood, on which the vehicle travels. The vehicle is partially loaded, i.e. preferably has a load of two passengers and especially is loaded with the usual luggage.

By the arrangement of the pivoting axis 30 above the vertical center 31 of holder 26 or 27, when the vehicle is traveling, for example on uneven surfaces, it is possible for the rear wheels to deflect rearwards in an arc in addition to moving up and down, so that by this means a high level of riding comfort is attained. Preferably the vertical center 31 corresponds to the center of the wheel not depicted in FIG. 2, especially in a vertical direction.

The compound crank 20 can be provided with a Watt linkage 33. The compound crank 20 can also be implemented without a Watt linkage.

The compound crank 20 of FIG. 2 is configured in such a way that the connection elements 24, 25 placed on it can be configured as vertical bushings 34. The bushing 34 preferably has an outer sleeve and an inner sleeve placed on it, which are connected with each other by means of a surrounding elastic material, especially rubber. The outer sleeve and inner sleeve preferably are coaxial relative to a common central axis which is vertical relative to the installed state of the bushing 34.

The trailing arms 21 and 22 engage on their inner sleeve into the vertical bushing 34. For this, preferably the trailing arms 21, 22 are attached in single shear to the particular associated bushing 34. The outer sleeve is attached to the vehicle body shell 110.

In contrast to that, the compound crank 20 of FIG. 1 is configured in such a way that the connection elements 24, 25 connected thereon can be configured as a bushing 35 that is positioned horizontally in the installed state.

Figure 3:
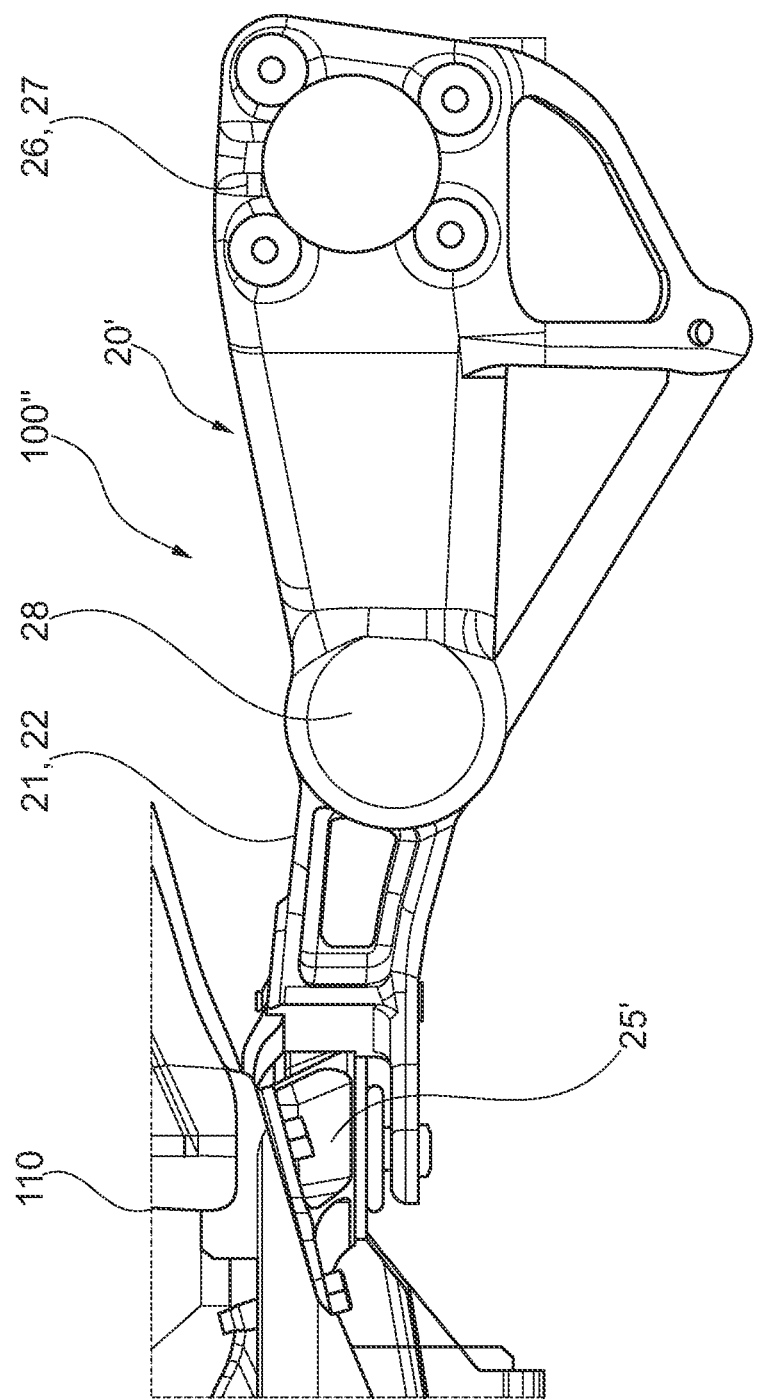
FIG. 3 still another rear end of a vehicle in a side view as a cross section.

FIG. 3 shows a cross section of another embodiment form of a rear end 100" in a side view. The rear end 100" has a compound crank 20' which can be used in the context of the present invention and is provided for attachment to connection element 25', which—related to the installed state—is configured as an essentially vertically-standing bushing 34 with a double-shear attachment to the associated trailing arm 21 or 22.

The bushing 34 preferably has an outer sleeve and an inner sleeve placed within it, which are connected to each other by means of a surrounding elastic material, especially rubber. Preferably the outer sleeve and inner sleeve are coaxial relative to a common central axis. The outer sleeve and inner sleeve preferably are coaxial relative to a common central axis which is situated essentially vertical, related to the installed state of the bushing 34.

The trailing arms 21 and 22 engage into the vertical bushing 34 on their inner sleeve. For this, the trailing arms 21 and 22 are connected to the associated bushing 34 preferably with double shear, in that for example the one end of the trailing arms 21, 22 is configured in the manner of a fork so that the fork legs engage onto the front sides of the inner sleeve, preferably above and below. The outer sleeve in turn is attached to the body shell 110 of the vehicle. Such an attachment of trailing arms of a compound crank to the vehicle body by means of such a vertical A-bushing is also designated as an inverse attachment to a vertical A-bushing with a double-shear fixation of the trailing arm on the A bushing.

The invention claimed is:

1. An arrangement for the rear end of a motor vehicle comprising a fuel filler line and a compound crank, said compound crank including two trailing arms and a cross member connecting the trailing arms with each other, said trailing arms being pivotably supportable in the direction of their longitudinal axis on their one end area by means of a connection element on a body shell of the vehicle, and having on their other end area a holder for a wheel bearing unit wherein the filler line crosses above at least one of the trailing arms in a crossing area that is between a connection site for the cross member and the connection element on the body shell, wherein the filler line is positioned in the crossing area with the at least one trailing arm above the trailing arm, and wherein the filler line crosses at least one of the trailing arms in the area that is between the connection element and the cross member and substantially adjacent to the connection element.

2. The arrangement according to claim 1, wherein the filler line crosses above at least one of the trailing arms in the area that is between the connection element and the cross member and that is closer to the connection element on the body shell relative to the cross member, said cross member connected to each trailing arm in an area that is between a damper unit and the connection element on the body.

3. The arrangement according to claim 1, wherein the filler line crosses above the trailing arm with a section running from an external portion of a body shell toward an internal portion of the vehicle.

4. The arrangement according to claim 1, wherein the connection element and holder of each trailing arm is so configured that in the installed state of the compound crank with partial loading of the vehicle, a horizontal pivot axis of each of the trailing arms of the compound crank is situated essentially at a height of a vertical center of each holder or above the vertical center of the holder of each trailing arm.

5. The arrangement according to claim 1, wherein the trailing arms on their ends are configured in a U-shape.

6. A vehicle comprising a fuel filler line, a compound crank, two trailing arms and a cross member connecting the trailing arms with each other, with the trailing arms being pivotably supportable in the direction of their longitudinal axis on their one end area by means of a connection element on a body shell of the vehicle, and having on their other end area a holder for a wheel bearing unit, wherein the fuel filler line crosses above at least one of the trailing arms in a crossing area that is between a connection site for the cross member and the connection element on the body shell of the vehicle and substantially adjacent to the connection element.

7. The vehicle according to claim 6, wherein the filler line crosses at least one of the trailing arms in the area that is between the connection element on the body shell and the cross member, and that is closer to the connection element on the body shell relative to the cross member, said cross member connected to each trailing arm in an area that is between a damper unit and the connection element on the body.

8. The vehicle according to claim 6, wherein the filler line, extending from a filler neck, crosses above the trailing arm with a section running from an external portion of a body shell toward an internal portion of the vehicle.

9. The vehicle according to claim 6, wherein the connection element and holder of each trailing arm is so configured that in the installed state of the compound crank with partial loading of the vehicle, a horizontal pivot axis of each of the trailing arms of the compound crank is situated essentially at a height of a vertical center of each holder or above the vertical center of the holder of each trailing arm.

10. The vehicle according to claim 6, wherein the trailing arms on their ends are configured in a U-shape.

11. A rear end of a vehicle comprising a fuel filler line, a compound crank, two trailing arms and a cross member connecting the trailing arms with each other, with the trailing arms being pivotably supportable in the direction of their longitudinal axis on their one end area by means of a connection element on a body shell of the vehicle, and having on their other end area a holder for a wheel bearing unit, wherein the filler line crosses above at least one of the trailing arms in a crossing area that is between a connection site for the cross member and the connection element on the body shell of the vehicle and substantially adjacent to the connection element.

12. The rear end of a vehicle according to claim 11, wherein the filler line crosses above at least one of the trailing arms in the area that is between the connection element on the body shell and the cross member, and that is closer to the connection element on the body shell relative to the cross member, said cross member connected to each trailing arm in an area that is between a damper unit and the connection element on the body.

13. The rear end of a vehicle according to claim 11, wherein the filler line, extending from a filler neck, crosses above the trailing arm with a section running from an external portion of the body shell toward an internal portion of the vehicle.

14. The rear end of a vehicle according to claim 11, wherein the connection element and holder of each trailing arm is so configured that in the installed state of the compound crank with partial loading of the vehicle, a horizontal pivot axis of each of the trailing arms of the compound crank is situated essentially at a height of a vertical center of each holder or above the vertical center of the holder of each trailing arm.

15. The rear end of a vehicle according to claim 11, wherein the trailing arms on their ends are configured in a U-shape.

* * * * *